United States Patent
Maerkl (10) Patent No.: US 8,627,736 B2
(45) Date of Patent: Jan. 14, 2014

(54) VARIABLE SPEED TRANSMISSION FOR MOTOR VEHICLES

(75) Inventor: Johann Maerkl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/370,719

(22) Filed: Feb. 10, 2012

(65) Prior Publication Data

US 2012/0204675 A1 Aug. 16, 2012

(30) Foreign Application Priority Data

Feb. 14, 2011 (DE) .......................... 10 2011 011 170

(51) Int. Cl.
*F16H 3/08* (2006.01)
(52) U.S. Cl.
USPC ............................................. 74/325; 74/329
(58) Field of Classification Search
USPC .......................................... 74/325, 329, 330
See application file for complete search history.

(56) References Cited

U.S. PATENT DOCUMENTS

| | | | | |
|---|---|---|---|---|
| 4,428,247 A | * | 1/1984 | Young ............................... | 74/331 |
| 5,383,375 A | * | 1/1995 | Ogawa et al. ................... | 74/330 |
| 5,881,600 A | * | 3/1999 | Fan ................................. | 74/329 |
| 7,350,430 B2 | * | 4/2008 | Heinzelmann ................. | 74/325 |
| 2011/0030488 A1 | | 2/2011 | Gumpoltsberger et al. | |

FOREIGN PATENT DOCUMENTS

| | | |
|---|---|---|
| DE | 37 23 597 A1 | 2/1988 |
| DE | 42 05 668 A1 | 8/1993 |
| DE | 202 02 581 U1 | 5/2002 |
| DE | 10 2004 041525 A1 | 3/2006 |
| DE | 10 2006 055582 A1 | 6/2008 |
| DE | 10 2006 002 943 A1 | 3/2009 |
| EP | 0 092 964 A1 | 11/1983 |
| EP | 1 281 892 A2 | 2/2003 |
| EP | 1 532 383 B1 | 5/2005 |
| FR | 2 681 015 A1 | 3/1993 |
| JP | 60 227044 A | 11/1985 |
| WO | WO 2006/084555 A1 | 8/2006 |

* cited by examiner

*Primary Examiner* — Ha D Ho
(74) *Attorney, Agent, or Firm* — Henry M. Feiereisen LLC (57) ABSTRACT

A variable speed transmission for motor vehicles includes multiple drive gears which are switchable by means of at least one gear changing device, in particular by means of synchronous shifting clutches, in particular multiple forward gears and a reverse gear. The variable speed transmission is subdivided or divided into at least two part-transmissions each with multiple gears, by at least one shifting device in particular least one shifting clutch in such a manner that at least one of the part-transmissions is engaged and at least one of the part-transmissions is disengaged as a function of one of the drive gears as selected by the gear changing device and/or as a function of defined shifting states of the shifting device.

25 Claims, 4 Drawing Sheets

VARIABLE SPEED TRANSMISSION FOR MOTOR VEHICLES

CROSS-REFERENCES TO RELATED APPLICATIONS

This application claims the priority of German Patent Application, Serial No. 10 2011 011 170.0, filed Feb. 14, 2011, pursuant to 35 U.S.C. 119(a)-(d).

BACKGROUND OF THE INVENTION

The invention relates to a variable speed transmission for motor vehicles.

For example EP 1 532 383 B1 discloses a variable speed transmission having an input shaft, a layshaft arranged axially parallel to the input shaft and a drive shaft coaxial to the input shaft and in which between a direct gear (highest forward gear) and the other gear wheels a shifting clutch is provided which in the direct gear uncouples the remaining gear wheels, so that the latter are stationary in the corresponding drive mode. This has the advantage that during driving in the direct gear smaller friction and churning losses occur at an improved transmission efficiency. In such a coaxial arrangement of input shaft and driven shaft such a decoupling can be constructed relatively easily; the improved transmission efficiency is only achieved in the highest gear.

SUMMARY OF THE INVENTION

The object of the invention is to propose a variable speed transmission with multiple forward gears and a reverse gear and preferably with non-coaxial arrangement of input shaft and driven shaft, in which improved efficiencies can be achieved over an extended driving operation with constructively simple means.

The solution of this objective is attained by a variable speed transmission for motor vehicles, with multiple pears, in particular multiple forward pears and a reverse gear which are switchable via pear wheel sets by at least one gear changing device, in particular by synchronous clutches, wherein the variable speed transmission is subdivided or divided by at least one shifting device into at least two part-transmissions each including multiple gears, so that at least one of the part-transmissions is engaged and at least one of the part-transmissions is disengaged as a function of one of the drive pears as selected by the pear changing device and/or as a function of defined shifting states of the shifting device. Advantageous refinements of the invention are set forth in the sub claims.

According to the invention, a variable speed transmission is proposed with multiple drive gears which are shiftable via gear sets by means of at least one gear changing device in particular by means of synchronous shifting clutches, in particular with multiple forward gears and a reverse gear. According to the invention, the variable speed transmission is divided into at least two part-transmissions by means of at least one shifting device, in particular by means of at least one shifting clutch, such that at least one of the part-transmissions is shifted and at least one of the part-transmissions is disengaged in dependence on a drive gear which is predetermined by means of the at least one variable speed transmission and/or in dependence of defined gear states of the at least one gear device.

For reasons of clarity and without intention to narrow the scope of protection defined by the claims, the advantages of the solution according to the invention are explained in the following by way of a concrete embodiment having two part-transmissions, in which the part-transmission which can be disengaged is referred to as part-transmission I and the part-transmission which is shifted active or can be shifted active respectively, when the part-transmission I is disengaged, is referred to as part-transmission II:

In particular when the longer transmission ratios are assigned to the part-transmission II and the shorter transmission ratios are assigned to the part-transmission I a driving with more favorable transmission efficiencies is possible over wide ranges of driving conditions, while in ranges of lower speeds of the motor vehicle the friction and churning losses are less severe because of the smaller time fraction and are thus negligible. The proposed solution of disengaging at least one part-transmission in the higher speed range significantly decreases the control and manufacturing effort required therefore.

For a variable speed transmission having four or more forward gears it is proposed that at least two highest not necessarily sequential gears are assigned to the part-transmission II. The lower forward gears and the reverse gear are turned off when driving at higher speed. In case of six or more forward gears, the four highest gears can be assigned to the part-transmission II so that the driving range with disengaged part-transmission I is significantly expanded. The proposed transmission layout can even be adjusted beforehand to a driving profile frequently occurring during operation of a motor vehicle.

In a structurally advantageous and relatively simple embodiment of the invention, an input shaft of the variable speed transmission can be divided functionally by only one shifting device, preferably by a shifting clutch, into two input shafts, which are assigned to the part-transmissions I and II via corresponding gear sets. According to a preferred refinement, it is proposed that the input shaft of the part-transmission carries the shiftable idler gears of the higher gears whose assigned fixed gears are supported on an driven shaft, while the input shaft of the part-transmission I includes the fixed gears of the lower gears, whose shiftable idler gears are supported on the common driven shaft. As a result, the part-transmission I is completely disengaged with regard to the meshing gear wheels at a minimal additional effort, and does not cause any losses in efficiency.

Further, the shifting device can be formed by a twin shifting clutch, which in a neutral position disconnects both input shafts of the part-transmissions, while in one shifting position the shifting clutch couples both input shafts to one another and in the other shifting position forms a reverse gear. For forming the reverse gear it is proposed that an idler gear or in general a reverse gear wheel connects an auxiliary shaft which has reversing gear wheels to a shiftable forward gear wheel which is preferably assigned to a lower gear. The shifting clutch therefore accomplishes in a constructively and functionally simple manner beside the decoupling function also the shifting of the reverse gear of the variable speed transmission. The ratchet of the reverse gear on the input shaft is possible because the auxiliary shaft enables a two-step transmission ratio.

In a modified construction of the variable speed transmission, the input shaft which is assigned to the part-transmission I can be a hollow shaft, through which the input shaft of the part-transmission II traverses, wherein the hollow input shaft in reverse drive can be coupled to the input shaft of the part-transmission II via the one shifting clutch. With this, the orientation of the part-transmissions I and II is reversed which may be advantageous for constructive reasons or for reasons of mounting in the motor vehicle.

In a further constructive variation, in a variable transmission with multiple forward gears which are assigned to the part-transmission I, these multiple forward gears can be divided again into two sub-transmissions Ia and Ib, between which the part-transmission II is positioned. Particularly preferred is an embodiment in which the hollow input shaft of the part-transmission I is divided into two hollow shaft sections, which optionally can be coupled to the input shaft of the part-transmission II via two twin shifting clutches or which in the other shifting position each connect one idler gear of the part-transmission II to the input shaft.

The reverse gear can be configured with an auxiliary shaft which overlaps the part-transmission II and carries two reversing gear wheels. Preferably, the reversing gear wheels mesh on one hand with a fixed gear wheel on the hollow shaft section of the one sub-transmission Ib and a shiftable idler gear on the common driven shaft of the other part-transmission Ia. This combination advantageously makes a separate shifting clutch for shifting of the reverse gear unnecessary.

In a further advantageous embodiment of the invention, beside the shifting device which subdivides the input shafts of both part-transmissions I and II, for example a twin shifting clutch, a second shifting device, preferably a twin shifting clutch can be provided on the driven shaft, which optionally connects multiple gear wheels in particular two fixedly interconnected forward gear idler gears and/or a reverse gear idler gear to the driven shaft. Preferably, within this context the twin shifting clutch on the input shaft actively shifts either an idler gear of a forward gear or a double gear wheel which is firmly connected to the input shaft, which double gear wheel meshes with the idler gear of the second forward gear and additionally with a reversing gear wheel of the reverse gear. This allows integrating both shifting clutches in such a way that reverse gear and disengagement of the part-transmissions are combined to allow for a simple control.

Further, in an advantageous configuration of the variable speed transmission for a motor vehicle with all-wheel drive and with an interaxle differential connected to the driven shaft, the driven shaft can likewise be two-part, wherein the driven shaft section of the part-transmission I is configured as hollow shaft, which outputs to the differential case of the interaxle differential, whose output shafts effect output of a rear axle differential and in the reverse drive effect output to the second driven shaft section through the hollow shaft to drive a front interaxle differential.

For this, the driving connection between the driven shaft section of the part-transmission II and the reverse driving output shaft of the part-transmission I can be released via a shifting clutch which is arranged between the part-transmissions I and II when the part-transmission II is coupled. This simple measure achieves that an all wheel drive is established when driving in the lower forward gears or with part-transmission II respectively, and only one axle, in particular the front axle of the motor vehicle is driven, when driving with the higher forward gears or in the part-transmission II, respectively.

The shifting clutch on the driven shaft can preferably again be a twin shifting clutch, by means of which in the neutral position the connection between the driven shaft section and the corresponding output shaft is released, and further in the one shifting position the connection is established and in the other shifting position a reverse gear wheel on the driven shaft section is coupled to a reverse gear-fixed gear on the input shaft of the part-transmission I via the auxiliary shaft with reversing gears.

Finally, one of the respective gear wheels of the variable speed transmission which form the reverse gear can each be combined with a gear wheel of a forward gear, which is especially advantageous with regard to the axially required construction space of the transmission as well as with regard to manufacturing costs.

BRIEF DESCRIPTION OF THE DRAWING

In the following, multiple exemplary embodiments of the invention are explained in more detail. The schematic drawing shows in.

DETAILED DESCRIPTION OF PREFERRED EMBODIMENTS

Figure 1:
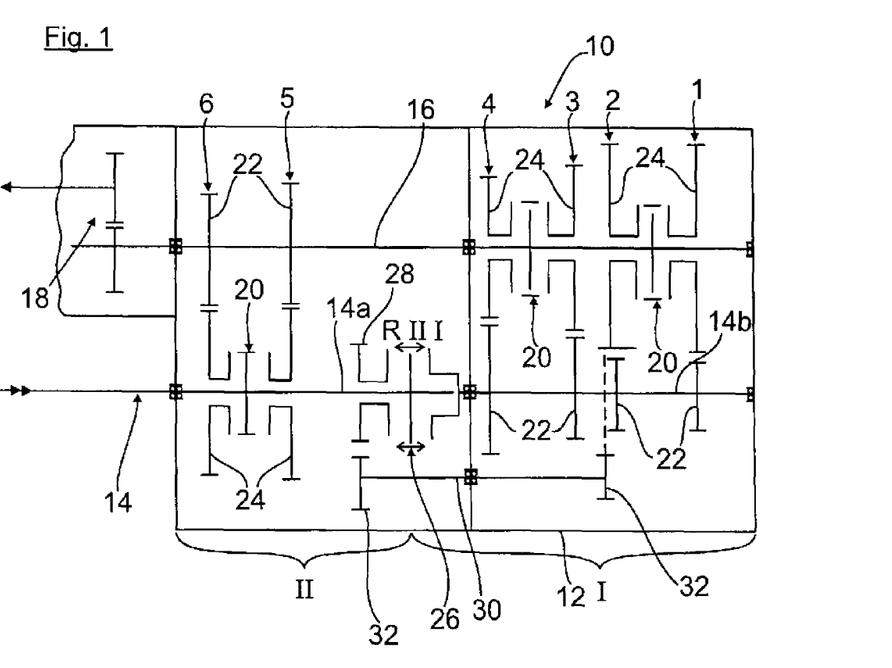
FIG. 1 a variable speed transmission for motor vehicles with an input shaft, a driven shaft and with six integrated forward gears and a reverse gear, which are divided into two part-transmissions I and II by means of a shifting clutch.

FIG. 1 shows a variable speed transmission 10 or transmission respectively as a block diagram, with an input shaft 14 which is rotatably supported in a transmission housing 12, a driven shaft 16 and an integrated front axle differential (not shown) which is driven via a spur gear 18 which is connected to the driven shaft 16.

On the input shaft 14 which is driven by a drive machine via a separation clutch (not shown) and on the driven shaft 16 are gear sets for forming forward gears 1 to 6, which can be shifted by twin synchronous clutches 20 which are common in transmissions and which are only shown as outline.

The gear sets of the forward gears 1 to 4 have four fixed gear wheels (uniformly designated 22) which are arranged on the input shaft 14, while their shiftable idler gears (uniformly designated 24) are supported on the driven shaft 16.

Further, the fixed gear wheels 22 of the forward gears 5 and 6 are fastened on the driven shaft 16, while their shiftable idler gears 24 are supported on the input shaft 14.

The input shaft 14 is divided into two input shafts 14a and 14b by twin shifting clutch 26 to form two part-transmissions I and II, wherein the forward gears 5 and 6 are assigned to the part-transmission II and the forward gears 1 to 4 are assigned to the part-transmission I. Further, as can be seen, the fixed gear wheels 22 of the forward gears 5 and 6 are arranged on the front input shaft 14a and the idler gears 24 of the forward gears 1 to 4 are arranged on the rear input shaft 14b, while the corresponding gear wheels 22, 24 are respectively positioned on the common driven shaft 16.

In addition, a shiftable idler gear 28 is rotatably supported on the input shaft 14a, which idler gear 28 in connection with an axially parallel auxiliary shaft 30 which has two reversing gears 32 and is rotatably supported in the transmission housing 12 forms a reverse gear R, wherein the one reversing gear 32 (indicated by dashed lines) engages with the idler gear 24 for the forward gear 2. For this, of course, the auxiliary shaft 30 is correspondingly offset out of the drawing plane so that the rotational axes of the shafts 14, 16, 30 form a triangle when viewed in a cross section.

In the drawn neutral position II, the two input shafts 14a, 14b are drivingly disconnected from one another via the shifting clutch 26 (adjustment in direction of the arrow). In the one shifting position I of the shifting clutch 26 (in the drawing towards the right) the two input shafts 14a, 14b are coupled to one another, in the opposite shifting position (in the drawing towards the left) the idler gear 28 of the reverse gear is shifted, wherein the force flux flows via the auxiliary shaft 30, the reversing gears 32 and for example the idler gear 24 of the forward gear 2 to the driven shaft 16. The synchronous clutch 20 for the forward gear 2 has to be closed in this instant; the disengaged input shaft 14b can rotate freely.

When driving in the forward gears 1 to 4 (part-transmission I) the shifting clutch 26 is in the right shifting position I and the force flux thus flows via the respective entire input shaft 14 of the transmission 10, via the respectively shifted forward gears 1 to 4 or their gear sets 22, 24 respectively, to the driven shaft 16. The gear sets of the forward gears 5 and 6 freely co-rotate.

When driving in the forward gears 5 and 6 (part-transmission II) the shifting clutch 26 is in its neutral position II so that the input shaft 14b of the part-transmission I is disengaged from the fixed gear wheels 22. The force flux now flows via the respectively shifted forward gear 5 or 6 or respectively its gear set 24, 22 to the driven shaft 16. Because the idler gears 24 on the driven shaft 16 are not shifted, only the corresponding coupling bodies of the synchronous clutches 20 rotate, while the gear wheels 24, 22 of the forward gears 1 to 4, the input shaft 14b and the idler gear 28 of the reverse gear R as well as the auxiliary shaft 30 with the reversing gears 32 are stationary or respectively do not cause friction or churning losses in the variable speed transmission 10.

Figure 2:
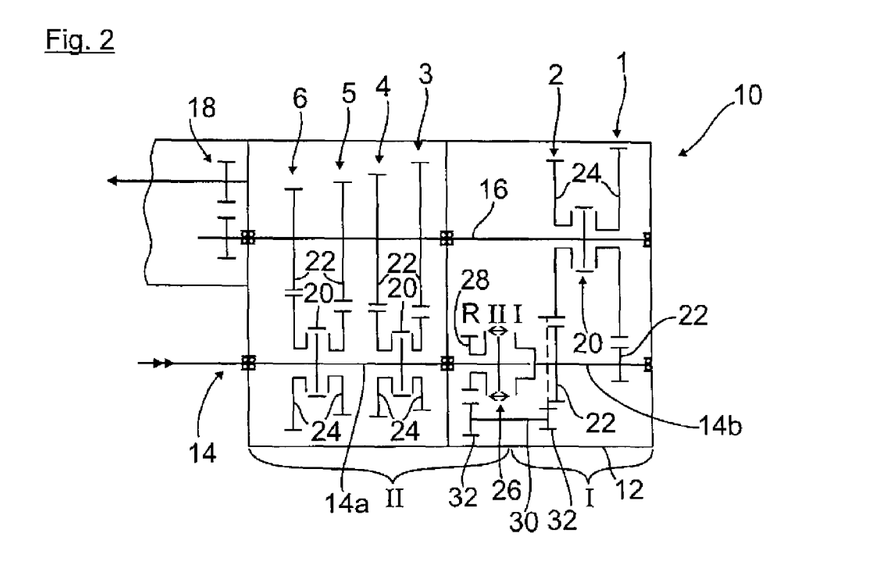
FIG. 2 the variable speed transmission according to FIG. 1 with a different arrangement of the forward gears which are assigned to the part-transmissions I and II.

FIG. 2 shows a further variable speed transmission corresponding to the one of FIG. 1, which is described only insofar as it significantly differs from the embodiment according to FIG. 1. Same parts are designated with same reference signs. This also applies to the additional, further modified transmissions shown in FIGS. 3 to 6.

In FIG. 2 the forward gears 1 and 2 as well as the reverse gear R are assigned to part-transmission I and the forward gears 3 to 6 are assigned to the part-transmission II.

This means that only the fixed gear wheels 22 of the forward gears 1 and 2 are arranged on the disengageable input shaft 14b and mesh with the shiftable idler gears 24 on the driven shaft 16.

The reverse gear R with the idler gear 28, the auxiliary shaft 30 with the reversing gears 32 and the idler gear 24 of the forward gear 2 are arranged as described before.

In the four forward gears 3 to 6, the fixed gear wheels 22 are positioned on the driven shaft 16 and the shiftable idler gears 24 are positioned on the continuously driven input shaft 14a.

Accordingly, when the motor vehicle drives in the forward gears 3 to 6 or with the part-transmission II respectively, the part-transmission I with the forward gears 1 and 2 and the reverse gear R is disengaged and in this extended driving range does not cause friction and churning losses via the gear sets of the forward gears 1 and 2 and the reverse gear.

Figure 3:
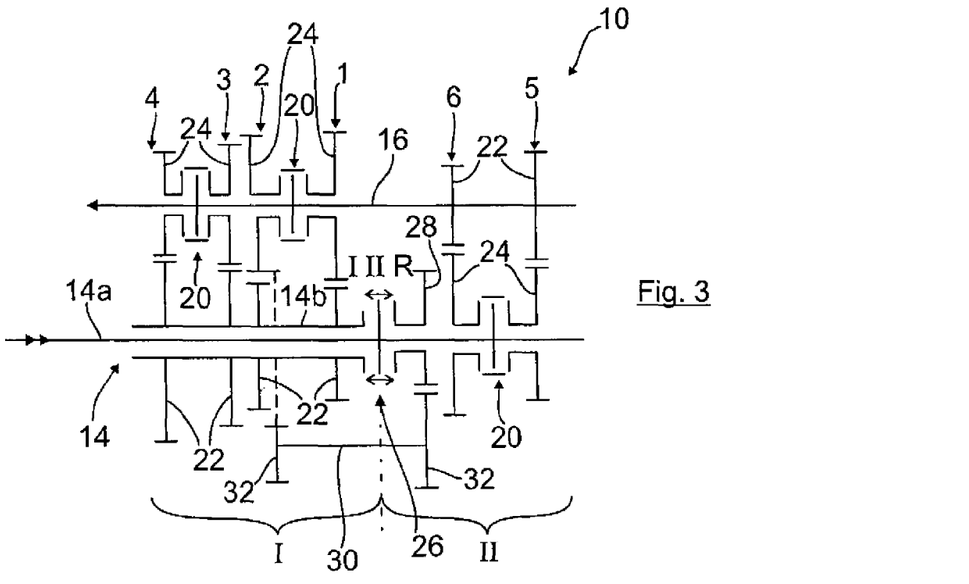
FIG. 3 the variable speed transmission according to FIG. 1 with an inversed arrangement of the two part-transmissions I and II.

FIG. 3 shows a variable speed transmission which is also modified relative to FIG. 1, in which the part-transmissions I and II, with regard to the forward gears, are arranged inversely or respectively, in which the part-transmission I is arranged in front and the part-transmission II there behind (in the drawing on the right side) and in which again the four forward gears 1 to 4 are assigned to the part-transmission I and the forward gears 5 and 6 to part-transmission II.

In distinction to FIG. 1, the input shaft 14 is divided into a continuous input shaft 14a of the part-transmission II and a hollow input shaft 14b coaxially supported in the transmission housing (not shown) relative to the part-transmission I.

The hollow input shaft 14b of the part-transmission I carries the fixed gear wheels 22 of the forward gears 1 to 4, whose idler gears 24 are supported on the common driven shaft 16 and are correspondingly shiftable via the synchronous shifting clutches 20.

The idler gear 28 which is shiftable in the one shifting position R is rotatably supported on the continuous input shaft 14a and drivingly connected to the idler gear 24 (indicated by the dashed line) of the forward gear 2 via the auxiliary shaft 30 and the reversing gears 32.

In the left shifting position in the drawing, the part-transmission I or respectively the hollow input shaft 14b is coupled to the inner input shaft 14a and the four forward gears 1 to 4 can be shifted.

In the neutral position II of the shifting clutch 26, the part-transmission I is disengaged and only the forward gears 5 and 6 can be shifted, wherein as described previously, the gear sets 22, 24 of the forward gears 1 to 4 and the reverse gear are stationary.

In the right shifting position R of the shifting clutch 26, the reverse gear is shifted, wherein the force flux again flows over the auxiliary shaft 30 and the likewise shifted idler gear 24 of the forward gear 2.

Figure 4:
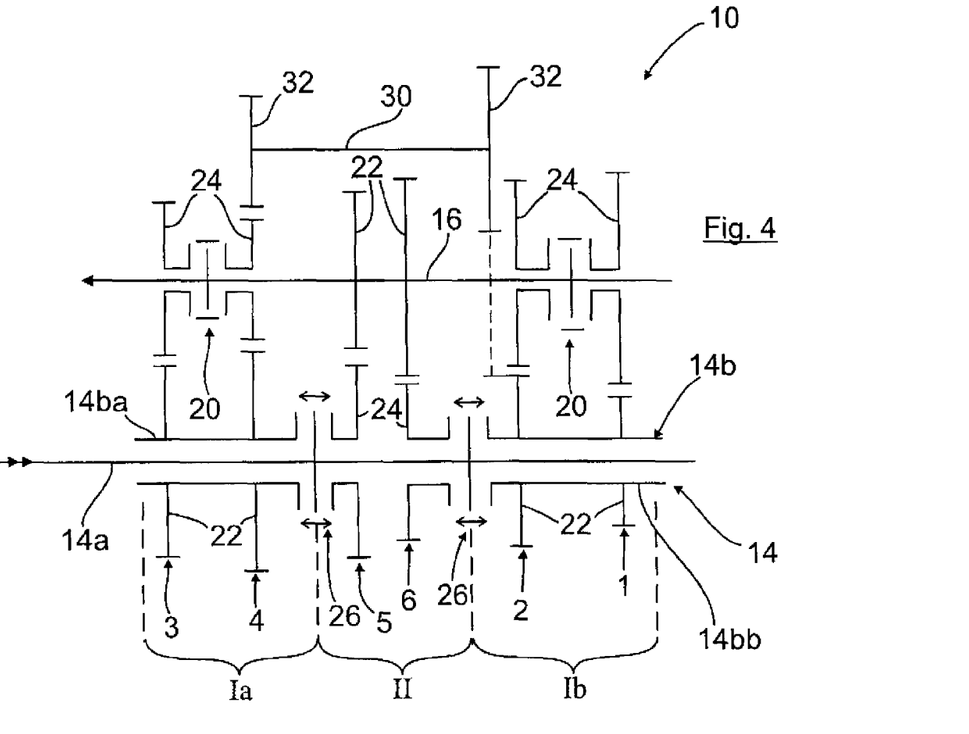
FIG. 4 the variable speed transmission according to FIG. 3 with a further, alternative arrangement or respectively, a division of the one part-transmission I into two sub-transmissions Ia and Ib and with two shifting clutches.

FIG. 4 shows a further modified variable speed transmission 10 in which the part-transmission II is integrated in the part-transmission I which is subdivided into two sub-transmissions Ia and Ib.

The gear sets of forward gears 5 and 6 which are assigned to the part-transmission II are supported on the continuous input shaft 14a with shiftable idler gears 24 and mesh with the corresponding fixed gear wheels 22 on the common driven shaft 16.

The sub-transmission Ia which is arranged on one side thereto includes the forward gears 3 and 4, wherein the corresponding fixed gear wheels 22 are positioned on a first hollow shaft section 14ba of the input shaft 14 and the corresponding idler gears 24 on the driven shaft 16.

The second sub-transmission Ib is arranged on the other side of the part-transmission II, and has a second hollow shaft section 14 bb, on which the fixed gear wheels 22 of the forward gears 1 and 2 are fastened. The fixed gear wheels 22 mesh with the shiftable idler gears 24 on the driven shaft 16.

The two hollow shaft sections 14ab, 14bb of the input shaft 14 can alternately be coupled to the input shaft 14a via two twin shifting clutches 26, so that in this shifting position either the forward gears 1 and 2 or the forward gears 3 and 4 are shiftable via the synchronous clutches 20.

From the central neutral position of the shifting clutches 26 towards the right or left respectively, the forward gears 5 and 6 of the central part-transmission II can be shifted alternately, wherein the two sub-transmissions Ia, Ib are then disengaged and their gear sets 22, 24 are stationary.

The reverse gear R is shifted by simultaneously closing the synchronous clutch 20 of the forward gear 4 of the sub-transmission Ia and the shifting clutch 26 of the sub-transmission Ib, wherein the auxiliary shaft 30 for the reverse gear R overlaps the central part-transmission II and the reversing gears 32 of the auxiliary shaft 30 mesh with the fixed gear wheel 22 (compare dashed drawn in line) of the forward gear 2 on the hollow shaft section 14*bb* and the idler gear 24 of the forward gear 4. The force flux flows over the fixed gear wheel 22 of the sub-transmission Ib, over the auxiliary shaft 30 and the shifted idler gear 24 of the forward gear 4 onto the driven shaft 16.

Because of the described arrangement of the transmission elements, in spite of the division of the input shaft 14 into three sections 14*a*, 14*ba* and 14*bb*, only four shifting clutches 20, 26 are required in total as in the previously described embodiments whose functions are merely distributed differently.

Figure 5:
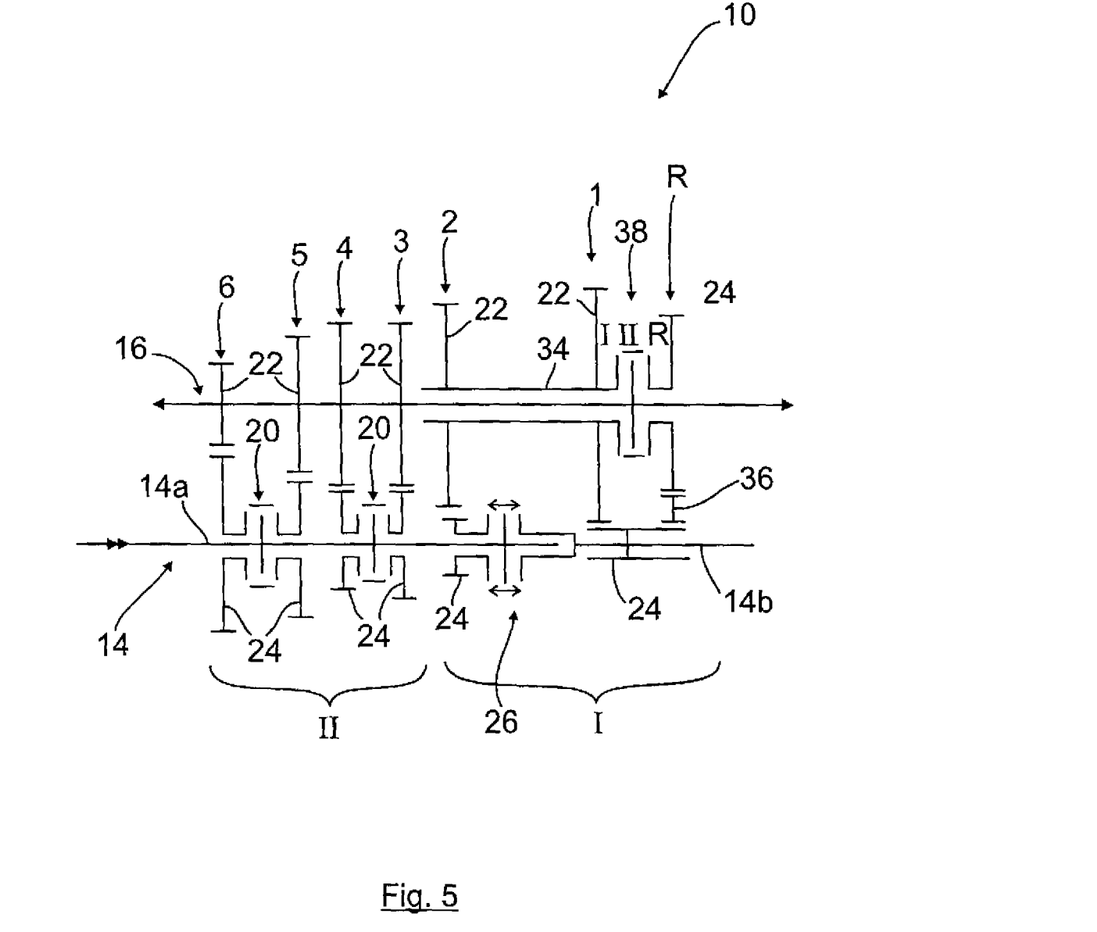
FIG. 5 a variable speed transmission modified relative to FIG. 2 with a shifting clutch integrated in the input shaft and in addition a shifting clutch integrated in the driven shaft.

FIG. 5 shows a further modified variable speed transmission 10 in which the reverse gear R is configured without arrangement of an auxiliary shaft 30.

According to FIG. 5, the input shaft 14 of the variable speed transmission 10 is divided into two input shafts 14*a*, 14*b* which are shiftable into the two part-transmissions I and II via the two shifting clutches 26 arranged there between.

The part-transmission II again has four forward gears 3 to 6, whose gear sets are formed by four shiftable idler gears 24 on the input shaft 14*a* and four fixed gear wheels 22 on the driven shaft 16. The idler gears 24 can be coupled to the input shaft 14*a* via two twin synchronous clutches 20.

The part-transmission I is provided with a hollow shaft 34 which is arranged coaxially on the driven shaft 16 and which carries two fixed gear wheels 22 of the gear sets for the forward gears 1 and 2, whose shiftable idler gears 24 are supported or arranged respectively, on the input shaft 14*a* (gear 2) and on the input shaft 14*b* (gear 1).

The gearwheel on the input shaft 14*b* which functions as idler gear 24, is configured with two tracks and at the same time meshes with a reversing gear 36 which is supported in the transmission housing (not shown), and which engages with an idler gear 24 for the reverse gear R, which idler gear 24 is supported on the driven shaft 16.

In the neutral position II, a second shifting clutch 38 on the driven shaft 16 disengages the hollow shaft 34 of the part-transmission I from the driven shaft 16, which hollow shaft 34 carries the two fixed gear wheels 22. In the shifting position towards the right the idler gear 24 is connected to the driven shaft 16 for shifting the reverse gear R, and the shifting clutch 26 on the input shaft 14*a* is also shifted toward the right. The force flux for the reverse gear R then flows over the input shafts 14*a*, 14*b* over the idler gear 24, the reversing gear 24 and the shifted idler gear 24 onto the driven shaft 16.

In the central position of the shifting clutches 26 and 38, the part-transmission I is disengaged from the part-transmission II and the corresponding gear sets of the gears 1, 2 and R do not rotate.

In the left shifting position of the shifting clutch 38 and right position of the shifting clutch 26, the forward gear 1 is shifted; the drive torque is conducted via the idler gear 24 onto the input shaft 14*b* and the fixed gear wheel 22 on the hollow shaft 34 to the shifting clutch 38 and from the latter to the driven shaft 16.

The forward gear 2 is conducted via the idler gear 24 on the input shaft 14*a*, the corresponding fixed gear wheel 22 on the hollow shaft 34 and the shifting clutch 38 to the driven shaft 16 when the shifting clutch 38 is still closed and the shifting clutch 26 is shifted.

When driving in the geared up forward gears 3 to 6 of the part-transmission II, the two shifting clutches 26, 38 are in the neutral position and thus the part-transmission I is disengaged or shut down, respectively.

Figure 6:
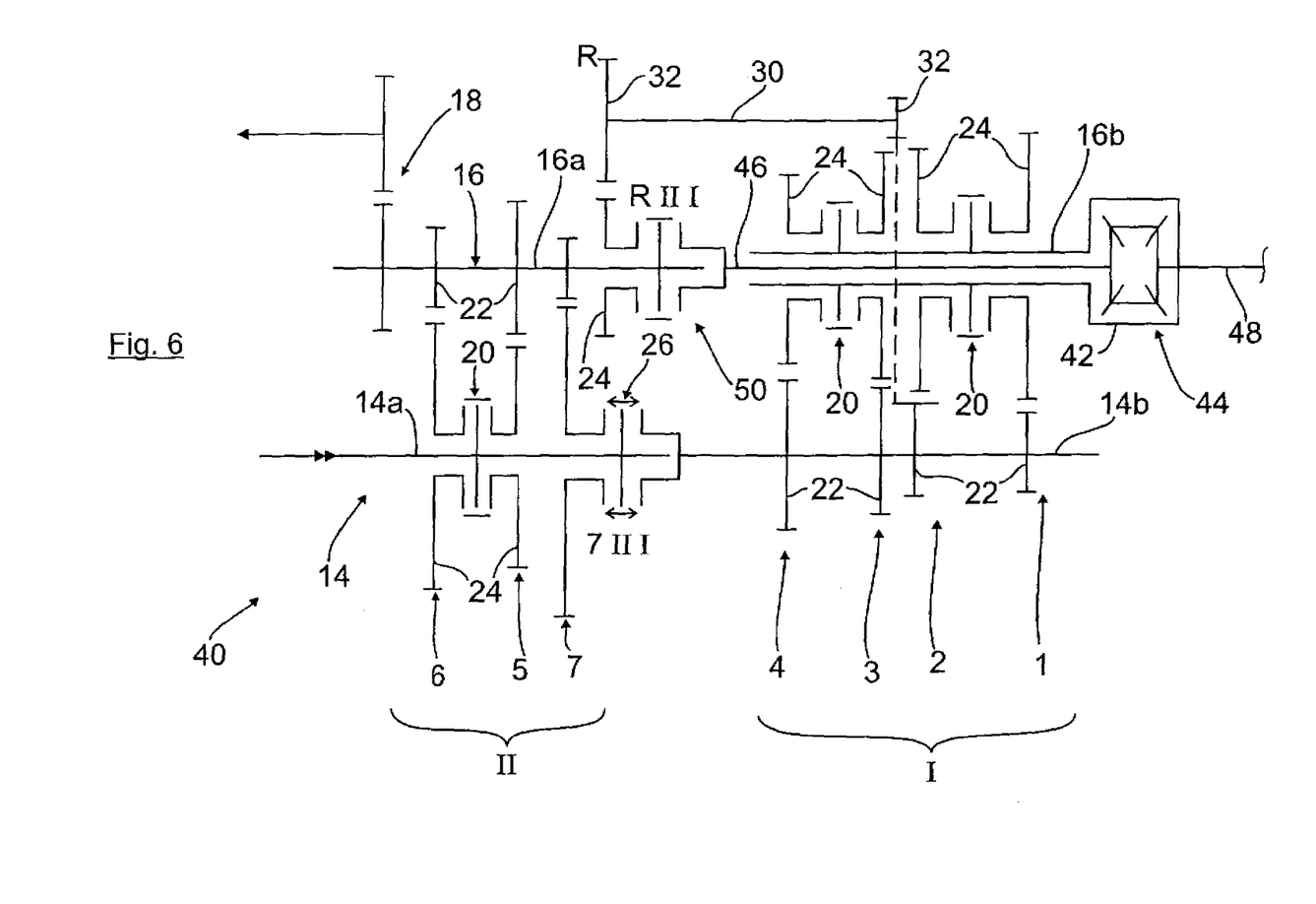
FIG. 6 a further variable speed transmission configured for an all wheel drive of a motor vehicle with two part-transmissions I and II, an interaxle differential and a drive distribution to either both axles of the motor vehicle or only to the front axle.

FIG. 6 shows a variable speed transmission 40 which is configured for a partial all wheel drive of a motor vehicle, in which the input shaft 14 is divided in a front input shaft 14*a* and a rear input shaft 14*b* via a first shifting clutch 26.

Likewise, the driven shaft 16 is divided into two sections 16*a* and 16*b*, wherein the coaxial driven shaft 16*b* is configured as hollow shaft.

The variable speed transmission 40 has seven forward gears 1 to 7 and a reverse gear R, which are again divided into two part-transmissions I and II. The forward gears 1 to 4 and the reverse gear R are assigned to the part-transmission I and the forward gears 5 to 7 to the part-transmission II.

The part-transmission I with the forward gears 1 to 4 and the reverse gear R is formed by four fixed gear wheels 22 on the input shaft 14*b*, which interact with four idler gears 24 on the hollow shaft 16*b* via synchronous clutches 20.

The hollow driven shaft 16*b* outputs to the differential case 42 of a interaxle differential 44 (for example a bevel gear differential), whose output shaft 48 drives a rear axle differential (not shown) for the drive of the rear wheels of the motor vehicle, while the second output shaft 46 in the reverse drive outputs to the front driven shaft 16*a* through a hollow driven shaft 16*b* and via a second twin shifting clutch 50, which front driven shaft 16*a* drivingly acts on the front axle differential via the spur gear 18 for driving the front wheels.

The shifting clutch 50 between the driven shaft 16*a* and the output shaft 46 of the interaxle differential 44 in the central neutral position II separates the two shafts, while in the right shifting position couples the two shafts 16*a*, 46 to one another. In the left shifting position, it connects the idler gear 24 on the driven shaft 16*a* for the reverse gear R via the auxiliary shaft 30 and the reversing gear 32 of the latter with the fixed gear wheel 22 on the input shaft 14*b* (the tooth engagement between the reversing gear 32 and the fixed gear wheel 22 is indicated again by the drawn in dashed line).

The shifting clutch 26 on the input shaft 14 in its neutral position II separates the two input shafts 14*a*, 14*b* while in the right shifting position it couples the latter to one another. In the left shifting position of the shifting clutch 26 the latter connects the corresponding idler gear 24 to the input shaft 14*a* for shifting of the forward drive 7.

When driving in the forward gears 5 and 6 via the transmission II, the two shifting clutches 26 and 50 are in the neutral position. The forward gear 7 of the part-transmission II is shifted in that the shifting clutch 26 in the left shifting position couples the input shaft 14*a* to the idler gear 24. The output to the driven shaft 16*a* occurs only to the front axle of the motor vehicle, when the gear wheels and shafts of the part-transmission I stand still.

When driving in the forward gears 1 to 4 or in the part-transmission I, the two shifting clutches 26, 50 are shifted into the right position and connect the two input shafts 14*a*, 14*b* and the driven shaft 16 to the output shaft 46 of the interaxle differential 44. When the corresponding synchronous clutches 20 are shifted, the force flux flows over the respective gear set 22, 24 of the shifted forward gear 1 to 4 onto the hollow driven shaft 16*b* and from this onto the interaxle differential 44, which distributes the drive torque to the two output shafts 46, 48 and finally onto the rear axle differential and via the driven shaft 16*a* and the spur wheel set 18 onto the front axle differential.

For shifting the reverse gear R, the shifting clutch 26 remains shifted in the right position, while the shifting clutch 50 is shifted into the left position. The drive torque then flows via the input shaft 14 to the fixed gear wheel 22 of the forward gear 2 and from the latter via the auxiliary shaft 30 with the reversing gear wheels 32 to the corresponding idler gear 24 and via the shifting clutch 50 to the driven shaft 16*a* or the front axle differential of the motor vehicle.

Thus, in the forward gears 1 to 4 (at correspondingly high drive torques at the wheels) the motor vehicle is driven with all wheel drive, while in the forward gears 5 to 7 (at lower drive torques) which are assigned to higher speeds, and in the reverse gear R it only outputs to the front axle. Optionally, the arrangement can be modified so that the reverse gear R is also included in the all wheel drive.

The shifting clutches 26, 38, 50 can be known synchronous clutches, as they are usually used in transmissions.

Even though by way of the exemplary representations of the FIGS. 1 to 6 the output in front is previously shown via a spur gear stage to a differential, it is of course also possible, to arrange the output at the rear in a manner known per se.

Further, it is possible, to arrange the gear set of the respective embodiment mirror image reversed if this is technically and/or construction space wise possible or useful.

What is claimed is:

1. A variable speed transmission for motor vehicles, comprising:
   gear sets defining shiftable drive gears, said gear sets including shiftable idler gears in cooperation with fixed gears;
   a gear changing device operably connected to the gear sets for shifting between the drive gears;
   a first shifting device subdividing the variable speed transmission into at least two part-transmissions, each including a plurality of the drive gears, such that a first one of the part-transmissions is coupled and a second one of the part-transmissions is disengaged as a function of one of the drive gears as selected by the gear changing device and/or as a function of defined shifting states of the first shifting device;
   an input shaft, said input shaft being functionally split into two input sub-shafts by the first shifting device and being operably connected to the first and second part-transmissions via associated ones of the gear sets; and
   a driven shaft, wherein one of the input sub-shafts carries the shiftable idler gears of higher ones of the drive gears, with the associated ones of the fixed gears being arranged on the driven shaft, wherein the other one of the input sub-shafts of the second part-transmission carries the fixed gears of lower drive gears, with the associated ones of the idler gears mounted onto the driven shaft.

2. The variable speed transmission of claim 1, wherein the drive gears comprise multiple forward gears and a reverse gear.

3. The variable speed transmission of claim 1, wherein the at least one gear changing device is constructed as a synchronous clutch.

4. The variable speed transmission of claim 1, wherein shorter gear ratios are associated to the second part-transmission.

5. The variable speed transmission of claim 4, wherein the shorter gear ratios are associated to the second part-transmission in relation to the first part-transmission.

6. The variable speed transmission of claim 4, wherein the drive gears involve at least four forward gears, increasing from a lowest gear to a highest gear, at least the two highest one of the gears being associated to the first part-transmission, wherein the two highest one of the gears need not be successive.

7. The variable speed transmission of claim 4, wherein the drive gears involve at least six forward gears, increasing from a lowest gear to a highest gear, at least the three or four highest one of the gears being associated to the first part-transmission.

8. The variable speed transmission of claim 1, wherein the first shifting device is constructed as a shifting clutch.

9. The variable speed transmission of claim 1, wherein the first shifting device is constructed as a twin shifting clutch adapted to separate the input sub-shafts in a neutral position, to couple the input sub-shafts in a neutral position in a first shifting position, and to implement a reverse gear in a second shifting position.

10. The variable speed transmission of claim 9, further comprising an auxiliary shaft provided with reversing gears, said reverse gear being implemented by connecting one of the idler gears via the auxiliary shaft with another one of the shiftable idler gears which defines a drive gear.

11. The variable speed transmission of claim 10, wherein the other one of the multiple gears is associated to a lower one of the drive gears.

12. The variable speed transmission of claim 1, wherein one of the input sub-shafts is operably connected to the second part-transmission and configured as a hollow shaft, said other one of the input sub-shafts being operably connected to the first part-transmission, when the second part-transmission is disengaged, and configured to extend through the one of the input sub-shafts, wherein the hollow shaft is adapted for engagement to the other one of the input sub-shafts via the first shifting device in a reverse gear.

13. The variable speed transmission of claim 8, wherein the second part-transmission is divided into two sub-transmissions, several of the forward gears being associated with the two sub-transmission of the second part-transmission, with the first part-transmission being arranged between the forward gears, when the second part-transmission is disengaged.

14. The variable speed transmission of claim 12, wherein the first shifting device has two twin shifting clutches, said hollow shaft being divided into two hollow shaft sections which are selectively shiftable via the twin shifting clutches in either of two ways, a first way in which the two hollow shaft sections are coupleable in one shifting position with the other one of the input sub-shafts of the first part-transmission, while the second part-transmission is disengaged, a second way in which the two hollow shaft sections connect in another shifting position an idler gear of the first part-transmission with the other one of the input sub-shafts, when the second part transmission is disengaged.

15. The variable speed transmission of claim 14, further comprising an auxiliary shaft overlapping the first-part transmission and including two reversing gears, said auxiliary shaft being positioned between the two sub-transmissions of the second part-transmission and forming the reverse gear.

16. The variable speed transmission of claim 15, wherein the second part-transmission is divided into two sub-transmissions, said reversing gears meshing with a fixed gear on one of the hollow shaft sections of one of the sub-transmissions and with a shiftable idler gear on a common driven shaft of the other one of the sub-transmissions.

17. The variable speed transmission of claim 1, further comprising a second shifting device provided on an driven shaft and including several gears for selectively connecting the gears to the driven shaft and/or an idler gear for a reverse gear to the driven shaft.

18. The variable speed transmission of claim 17, wherein the second shifting device is constructed as a twin shifting clutch.

19. The variable speed transmission of claim 17, wherein the gears are constructed as fixed gears securely fixed one another via a hollow shaft.

20. The variable speed transmission of claim 17, wherein the first shifting device is configured as a twin shifting clutch to actively switch on the input shaft an idler gear of a forward gear or a two track idler gear which is securely fixed to the input shaft and meshes with one of the gears for a further forward gear and with a reversing gear of a reverse gear.

21. The variable speed transmission of claim 1, further comprising an driven shaft, and an interaxle differential having a differential case and being connected to the driven shaft to thereby split the driven shaft into a hollow first output sub-shaft and a front second output sub-shaft, wherein the first output sub-shafts is operably connected to one of the part-transmissions and configured in driving relationship with the differential case, said interaxle differential having outgoing shafts which drive a rear-axle differential and in a reverse gear a front-axle differential through the first output sub-shaft and via the second output sub-shaft.

22. The variable speed transmission of claim 21, wherein the one of the part-transmission is the second part-transmission.

23. The variable speed transmission of claim 21, wherein the first shifting device is constructed as a shifting clutch arranged between the part-transmissions, wherein a driving connection between the hollow first output sub-shaft, operably connected to the first part-transmission, and a reverse driving one of the outgoing shafts, operably connected to the second part-transmission, is released via the first shifting device.

24. The variable speed transmission of to claim 23, further comprising an input shaft, said input shaft being functionally split into two input sub-shafts operably connected to the first and second part-transmissions, wherein the first shifting device is arranged on the driven shaft and configured as a twin shifting clutch which is configured to release in a neutral position the driving connection between the hollow first output sub-shaft and the reverse driving one of the outgoing shafts, to establish the driving connection in a first shifting position, and to engage in a second shifting position an idler gear on the first output sub-shaft via an auxiliary shaft provided with reversing gears with a fixed gear for a forward gear on one of the input sub-shafts which is associated to the second part-transmission.

25. The variable speed transmission of claim 2, wherein each gear of the gear sets forming the reverse gear is combined with a fixed gear or an idler gear for a forward gear.

* * * * *